May 29, 1934.  T. A. McCARTHY  1,961,060
PUTTING DEVICE
Original Filed Dec. 31, 1930
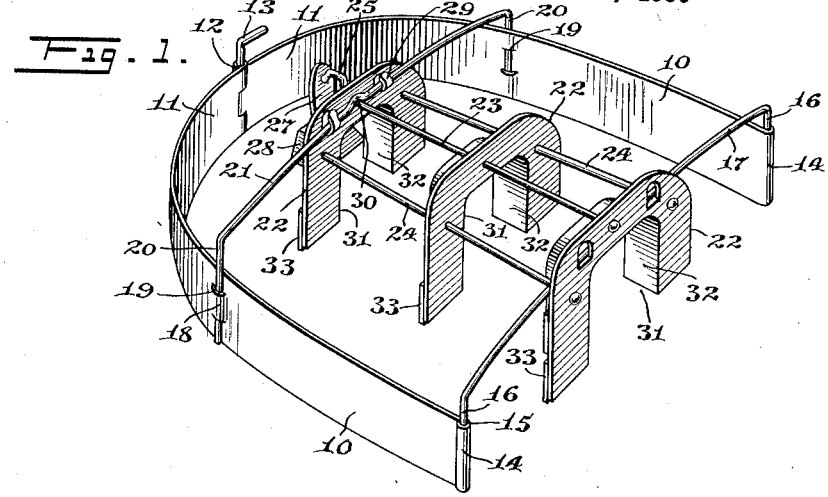
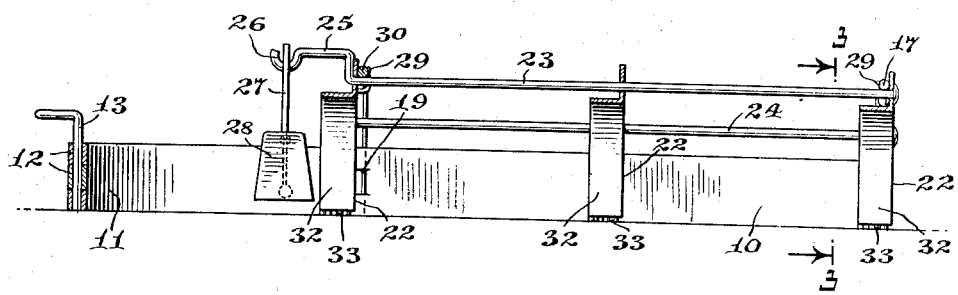
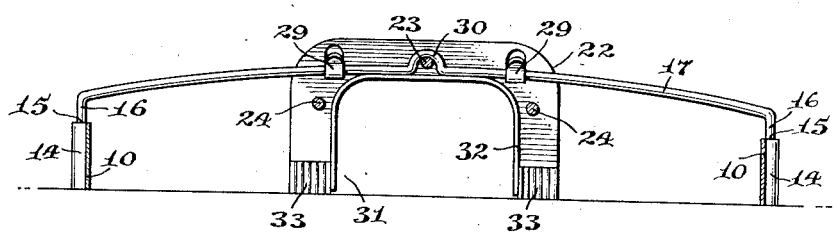
WITNESSES
Joe. R. Lamia
E. B. Marshall
INVENTOR
Theodore A. McCarthy
BY
Munn & Co.
ATTORNEYS Patented May 29, 1934

1,961,060

UNITED STATES PATENT OFFICE 1,961,060

PUTTING DEVICE

Theodore A. McCarthy, Nutley, N. J., assignor of one-half to John Kelly, Passaic, N. J.

Application December 31, 1930, Serial No. 505,945
Renewed November 29, 1933

11 Claims. (Cl. 273—32)

An object of the invention is to provide a putting device which is light in weight and inexpensive to manufacture.

Another object of the invention is to stamp the parts of the putting device from metal in forms which permit of their convenient assembly to form the complete device.

Still another object of the invention is to provide an enclosure with sides and a back, the enclosure having means for securing transverse members which serve to hold gate members in position.

A further object of the invention is to provide a plurality of gate members with their openings disposed behind each other with the width of the openings decreasing rearwardly.

The invention furthermore has as objects to provide the gate members with feet to prevent the gate members from slipping and to construct the enclosure in sections which are detachably held together and to which are detachably secured the transverse members connected with the gate members.

Additional objects of the invention will appear in the following specification in which the preferred form of the invention is described.

In the drawing similar reference characters refer to similar parts in all the views, of which Figure 1 is a perspective view illustrating the putting device, Figure 2 is an enlarged longitudinal sectional view of Figure 1, and Figure 3 is a sectional view on the line 3—3 of Figure 2.

By referring to the drawing it will be seen that the putting device is provided with an enclosure consisting of a plurality of members, preferably two members 10 which provide sides for the device and which extend rearwardly at 11 and have their adjacent rear edges formed with knuckles 12 in which a pin 13 is disposed for holding the rear portions 11 of the members 10 relatively to each other. The forward ends of the members 10 are preferably turned at 14 to form openings 15 in which depending terminals 16 of a transverse member 17 extend. The members 10 also have stamped-out portions 18 with openings 19 in which extend bearing terminals 20 of a transverse member 21. It will be understood that the transverse members 17 and 21 serve to hold the forward portions of the members 10 in position rearwardly of each other.

Disposed within the enclosure there is a plurality of gate members 22, these gate members being disposed substantially parallel and behind each other, as indicated in Figures 1 and 2 of the drawing. The gate members 22 are connected by a central top rod 23 and by side rods 24, the central top rod 23 extending rearwardly behind the rearmost gate member 22 and having a terminal 25 with a hook 26 on which is hung an arm 27 of a bell 28.

Preferably the transverse members 21 and 17 rest on the rod 23 and the forward and the rearmost gate members 22 are provided with clips 29 extending under and around the transverse members 21 and 17 to hold the gate members in position relatively to the transverse members 21 and 17 and the enclosure members 10. Preferably the transverse members 21 and 17 are bent to form bearings 30 which engage the rod 23 and prevent a lateral movement of the rod 23 relatively to the transverse members 21 and 17. The clips 29 are preferably stamped out of the faces of the gate members 22 and during this stamping operation preferably the central openings 31 in the gate members are formed by a stamping process which presses portions of the metal rearwardly around the openings 31 to provide side walls 32 at the said openings.

It will be seen by referring to the drawing, and particularly Figure 1, that the vertical center lines of the openings 31 in the gate members 22 are disposed substantially in alignment, but while this is so the width of the opening in the central gate member 22 is less than the width of the opening in the foremost gate member 22 and that, furthermore, the width of the opening in the central gate member 22 is greater than the width of the opening in the rearmost gate member 22. It will also be understood that the bell 28 will be disposed at the rear of the opening in the rearmost gate member 22.

With the construction which has been described, it will be necessary for the player to direct a ball with great accuracy, not only with reference to the opening in the foremost gate member 22, but also with reference to the openings in the central and rearmost gate members in order that the ball may pass through the openings in the several gate members and strike the bell 28. The enclosures at the sides and at the rear of the gate members will serve to prevent the balls from rolling out of bounds and will enable the player to readily collect the balls in order that his practice may be continued.

It will also be understood that inasmuch as the transverse members 21 and 17 may be quickly removed from the enclosure members 10 and the enclosure members 10 may be separated from each other for packing purposes, it will be possible to take down the putting device and pack it in a small compass in order that it may be conveniently shipped. Inasmuch as the enclosure members and the gate members, as well as the bell, may be stamped from sheet metal, and as the rods may be conveniently cut and bent to meet requirements, it will be seen that the putting device may be manufactured quickly and at very little expense.

By referring to Figures 2 and 3 of the drawing it will be seen that secured to the gate members 22 and depending therefrom there are rubber feet 33 which engage the supporting surface and which serve to retard any sliding movement of the putting device along the said supporting surface.

What is claimed is:

1. In a putting device, an enclosure having sides and a back, transverse members secured to the sides of the enclosure, a plurality of additional members each having an opening with the openings disposed substantially in alignment, and means cooperating with the transverse members and with the said additional members for holding the latter in position.

2. In a putting device, two transverse members, means for supporting the transverse members, a plurality of gate members spaced apart, the gate members having openings with their centers disposed substantially in alignment, a rod engaging the transverse members and connected with the gate members, and means for securing an adjacent gate member to a transverse member.

3. In a putting device, two transverse members, means for supporting the transverse members, a plurality of gate members spaced apart, the gate members having openings with their centers disposed substantially in alignment, a rod engaging the transverse members and connected with the gate members, the rod having a terminal extending beyond the rear gate member, and a bell mounted on the rod terminal.

4. In a putting device, two enclosing sections having knuckles at their adjacent edges, a pin in the knuckles for holding the sections relatively to each other, the sections having openings, a plurality of transverse members having terminals disposed in the openings, a plurality of gate sections each with an opening and a rod secured to the gate sections and engaging the transverse members.

5. In a putting device, two enclosing sections having knuckles at their adjacent edges, a pin in the knuckles for holding the sections relatively to each other, the sections having openings, a plurality of transverse members having terminals disposed in the openings, a plurality of gate sections each with an opening and a rod secured to the gate sections and engaging the transverse members, and additional rods connecting the sides of the gate sections.

6. In a putting device, two enclosing sections having knuckles at their adjacent edges, a pin in the knuckles for holding the sections relatively to each other, the sections having openings, a plurality of transverse members having terminals disposed in the openings, a plurality of gate sections each with an opening, a rod secured to the gate sections and engaging the transverse members, the rod having a terminal extending rearwardly of the rear gate member, and a bell supported by the rod terminal.

7. In a putting device, two enclosing sections having knuckles at their adjacent edges, a pin in the knuckles, the sections having openings, a plurality of transverse members having terminals disposed in the openings, a plurality of sections each with an opening, and means for securing the last mentioned sections relatively to the transverse members.

8. In a putting device, two substantially parallel side members, the side members having openings, a plurality of transverse members having terminals disposed in the openings, a plurality of sections each with an opening, and means for securing the sections relatively to the transverse members.

9. In a putting device, two side members, a plurality of members spaced apart and disposed between the side members approximately parallel with each other and at right angles to the side members, the second mentioned members being disposed in a row extending longitudinally of the side members and being secured to the side members, the second mentioned members each having an opening extending through its bottom, with the openings increasing in size from one end of the row, and members at the bottom of the second mentioned members to prevent slipping of the second mentioned members.

10. In a putting device, two side members, a plurality of members spaced apart and disposed between the side members approximately parallel with each other and at right angles to the side members, the second mentioned members being disposed one behind the other and each having an opening extending through its bottom with the openings increasing in size in one direction.

11. In a putting device, two side members, a plurality of members disposed between the side members and secured thereto, the second mentioned members each having an opening extending through its bottom, the central portions of the openings being in alignment and the openings increasing in size from one set of ends of the side members.

THEODORE A. McCARTHY.